United States Patent [19]

Diaz et al.

[11] Patent Number: 5,847,072
[45] Date of Patent: Dec. 8, 1998

[54] REMOVAL OF LITHIUM FROM POLYMER CEMENTS

[75] Inventors: Zaida Diaz; John David Wilkey, both of Houston, Tex.

[73] Assignee: Shell Oil Company, Houston, Tex.

[21] Appl. No.: 652,261

[22] Filed: May 23, 1996

Related U.S. Application Data

[60] Provisional application No. 60/009,527 Dec. 28, 1995.
[51] Int. Cl.⁶ ...................................................... C08F 6/24
[52] U.S. Cl. ........................... 528/482; 528/486; 526/173; 523/310
[58] Field of Search ..................................... 528/482, 486; 523/310; 210/681; 526/173

[56] References Cited

U.S. PATENT DOCUMENTS

| | | |
|---|---|---|
| 3,176,037 | 3/1965 | Warner . |
| 3,780,138 | 12/1973 | Hassell . |
| 4,098,990 | 7/1978 | Lutze et al. . |
| 4,636,540 | 1/1987 | Warfel ..................................... 523/310 |
| 5,391,663 | 2/1995 | Bening et al. . |

FOREIGN PATENT DOCUMENTS 54-1364  1/1979  Japan ..................................... 528/486

*Primary Examiner*—Fred Teskin
*Attorney, Agent, or Firm*—Fredrik Marlowe

[57] ABSTRACT

The selectivity of ion exchange processes for the removal of lithium from acids is improved when weak acids such as citric and acetic, are used in the wash step. An added improvement is realized by a two stage process of contacting the acid solution first with an ion exchange resin functional to remove the nickel and aluminum compounds from the acid solution; and then contacting the acid solution with an ion exchange resin which is more selective to remove the alkali metal compound from the acid solution.

4 Claims, No Drawings

REMOVAL OF LITHIUM FROM POLYMER CEMENTS

This application is a nonprovisional filing of United States provisional patent application Serial No. 60/009,527 filed Dec. 28, 1995.

BACKGROUND OF THE INVENTION

1. Field of the Invention

This invention pertains to a process for separating alkali metal compounds from a polymer cement. More specifically, this invention pertains to a process for removing alkali metal compounds from a low-viscosity functionalized polymer cement.

2. Prior Art

Acids are often used to remove catalyst residues and basic salts from organic solutions. Strong acids such as sulfuric and phosphoric acid are particularly effective at washing hydrogenation catalyst residues and basic salts from organic solutions. If it is desired to recycle the acids, ion exchange is used, but it is very difficult to remove lithium from the acids since most ion exchange resins have very low selectivity for lithium. The process is even less effective if the wash step requires the use of a concentrated acid.

SUMMARY OF THE INVENTION

It has now been discovered that the selectivity of ion exchange processes for the removal of lithium from acids is improved when weak acids such as citric acid or acetic acid, are used in the wash step.

An added improvement is realized by a two stage process of contacting the acid solution first with an ion exchange resin functional to remove the nickel and aluminum compounds from the acid solution; and then contacting the acid solution with an ion exchange resin which is more selective to remove the alkali metal compound from the acid solution.

DESCRIPTION OF PREFERRED EMBODIMENTS

This invention pertains to a change in the acid which is used to remove catalyst residues and basic salts from polymer cements, e.g., low-viscosity functionalized polymer cements. Strong acids such as sulfuric and phosphoric acid are particularly effective at washing hydrogenation catalyst residues and basic salts from organic solutions. If it is desired to recycle the acids, ion exchange is used, but it is very difficult to separate lithium from the acids since most ion exchange resins have very low selectivity for lithium. It has now been found that replacing the phosphoric or sulfuric acid with a weak acid, such as citric acid or acetic acid, will increase the selectivity of the ion exchange resin for lithium.

In addition it has been discovered that the removal of lithium from acid solution containing nickel and aluminum can be improved by using a two stage ion exchange process. It also has been discovered that several ion exchange resins have relatively high selectivity for lithium. These are "AMBERLYST 35" and "AMBERLYST 15", trademarks of Rohm and Haas for strong acid resins, H+ form, and "BAYER OC 1501", a trademark of Miles for a strong acid resin, H+ form. It has been found that lithium removal from acid solution is improved in a process where nickel and aluminum are removed first on a resin such as "AMBERLITE 200C", a trademark of Rohm and Haas for a strong acid resin, and lithium is removed next on one of the more selective resins.

The present invention is particularly applicable to low viscosity functionalized polymer diols (described hereinafter) and relates to lithium removal post hydrogenation. The polymerization process uses a lithium initiator, which is preferably a protected functional initiator (PFI). PFI diols contain one mole of lithium per mole of polymer, and the termination step produces a lithium salt. The presence of the lithium salt may affect hydrogenation performance, although the magnitude of this impact is not yet fully understood. In cases where hydrogenation performance is acceptable, the lithium salt may be removed post-hydrogenation in the same step used to remove the hydrogenation catalyst, which contains nickel and aluminum.

As mentioned, removal of the lithium salts from the polymer cement post-hydrogenation may be accomplished by washing the cement with a weak acid such as citric acid or acetic acid. This transfers the cations to the acid solution, which must then be treated to remove the salts before recycling. The "AMBERLYST 35" resin is preferred and has higher capacity and selectivity for lithium than "AMBERLITE 200C". A two bed configuration, in which a bed of "AMBERLITE 200C" is followed by a bed of "AMBERLYST 35", achieves the best compromise between resin selectivity, capacity, and regenerability in a fixed bed process. The process is preferably run a temperature within the range of 70° to 170° F., preferably about 140° F. The acid is preferably citric acid in a concentration of 0.2 to 40% w or acetic acid in a concentration of 0.2 to 40% w, and the lithium salt at a concentration of 0.005 to 5% w. The process is preferably run at a velocity of 2 bed volumes per hour.

Any alkali metal compound commonly found in a polymer solution when an alkali metal compound is used as the catalyst or initiator can be separated from the polymer. These include alkali metal hydrides, alkali metal alkoxides and alkali metal hydroxides.

Low viscosity functionalized polymer diols can be made in accordance with the following procedure:

Anionic polymerization of conjugated diene hydrocarbons with lithium initiators is well known as described in U.S. Pat. Nos. 4,039,503 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

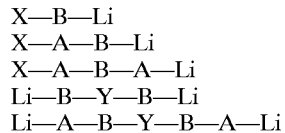

wherein B represents polymerized units of one or more conjugated diene hydrocarbons such as butadiene or isoprene. A represents polymerized units of one or more vinyl aromatic compounds such as styrene. X is the residue of a monolithium initiator such as secbutyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

Dilithium initiation with the diadduct of secbutyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymeric structures has been sufficient to provide dilithium initiation.

Alternatively, anionic polymerization of conjugated dienes may be performed using protected functional initiators (PFI) as described in U.S. Pat. Nos. 5,391,663 and 5,146,168 which are incorporated herein by reference.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy or amine groups by reaction with ethylene oxide, carbon dioxide, a protected hydroxystyrene monomer, ethylene oxide plus epichlorohydrin, or the amine compounds listed in U.S. Pat. No. 4,791,174, respectively.

The termination of living anionic polymers to form functional end groups is described in U.S. Pat. Nos. 4,417,029, 4,518,753 and 4,753,991 which are herein incorporated by reference. Of particular interest for the present invention are terminal hydroxyl, carboxyl, phenol, epoxy and amine groups. Such polymers with number average molecular weights between about 1000 and 20,000 as measured by gel permeation chromatography are low viscosity functionalized polymers.

Hydrogenation of at least 90%, preferably at least 95%, of the unsaturation in low molecular weight butadiene polymers is achieved with nickel catalysts as described in U.S. Pat. Nos. Re. 27,145 and 4,970,254, which are incorporated by reference herein. The preferred nickel catalyst is a mixture of nickel 2-ethylhexanoate and triethylaluminum.

It is preferable to extract the nickel catalyst after hydrogenation by stirring the polymer solution with aqueous phosphoric acid (2–30 percent by weight) at a volume ratio of about 0.33 to 0.50 parts aqueous acid to 1 part polymer solution, at about 50 degrees C. for 30–60 minutes while sparging with a mixture of oxygen in nitrogen. Alternatively, aqueous sulfuric acid will suffice to remove the hydrogenation catalyst.

EXAMPLES

Example 1

Two column experiments were conducted to compare the effectiveness of lithium removal from two acids having the same normality but different acid strengths. Phosphoric acid and citric acid were selected for this comparison. The lithium, nickel and aluminum levels in both acids were similar. So were the process conditions such as temperature, flow rate, column dimensions, specific resin used, etc. In the experiment with 20% w phosphoric acid (2.2N), lithium breakthrough occured after 2 bed volumes (BV) of acid had been treated. In the experiment with 36% w citric acid (2.2N), lithium breakthrough occured at 16 BV.

Example 2

Two column experiments were carried out with 20% w phosphoric acid containing 280 ppm Li and about 100 ppm each Ni and Al. In the first experiment a 20 cc bed of "AMBERLITE 200C" was used. In the second experiment, the bed consisted of 10 cc of "AMBERLITE 200C" followed by 10 cc of "AMBERLYST 35". All other parameters such as flow rate, temperature, bed L/D, etc. were the same in both experiments. The results obtained in these tests show that using the two resins in series increased the volume of acid treated before lithium breakthrough from 2 bed volumes to 6 bed volumes.

Example 3

The higher lithium selectivity of "AMBERLYST 35", "AMBERLYST 15", and "BAYER OC 1501" was identified in isotherm tests. Screening experiments to select the best resins consisted of shake tests to equilibrate the resin or adsorbent with a 2% w phosphoric acid solution containing 230 ppm lithium. The acid to adsorbent weight ratio in these tests was 100:1 and the temperature was 73° F. After equilibration, the residual lithium in the acid solution was determined by ion chromatography. From these results, the most effective materials for lithium removal were identified. Testing included chelating resins, strong acid resins, a weak acid resin, a strong base resin with and without addition of chelating agents, an inorganic oxide, inorganic ion exchangers, several zeolites, alumina, acid-activated carbon, and activated carbon impregnated with a crown ether. The results identified "AMBERLYST 35", "BAYER OC 1501", and "AMBERLYST 15" as the most effective materials for lithium removal. It is not clear why these resins are particularly effective. It appears that one of the key factors is that these are strong acid resins in the H+ form. But even among strong acid resins in the H+ form, there seems to be some differences in effectiveness. It is suspected these are due to differences in structure (e.g. pore size) and/or acid strength.

We claim:

1. A process for separating an alkali metal compound from a low viscosity functionalized polymer cement comprising:

washing the polymer cement with a weak acid selected from the group consisting of citric acid and acetic acid, to remove said alkali metal compound from the polymer cement;

removing the alkali metal compound from the weak acid by ion exchange; and recycling the acid to wash more cement.

2. The process of claim 1 wherein the alkali metal is lithium.

3. A process for separating an alkali metal compound from a low viscosity functionalized polymer cement comprising:

washing the polymer cement with a weak acid selected from the group consisting of citric acid and acetic acid, to remove said alkali metal compound from the polymer cement, the acid also containing nickel and aluminum compounds;

removing the alkali metal compound from the acid by contacting the acid first with an ion exchange resin functional to remove the nickel and aluminum compounds from the acid solution and then contacting the acid with an ion exchange resin which is more selective to remove the alkali metal compound from the acid; and recycling the acid to wash more cement.

4. The process of claim 3 wherein the alkali metal is lithium.

* * * * *